July 27, 1965   J. W. HOLZMAN   3,197,231
FLUID SUSPENSION LEVELING CONTROL SYSTEM
Filed April 19, 1962   4 Sheets-Sheet 1

July 27, 1965        J. W. HOLZMAN        3,197,231

FLUID SUSPENSION LEVELING CONTROL SYSTEM

Filed April 19, 1962        4 Sheets-Sheet 3

United States Patent Office 3,197,231
Patented July 27, 1965

3,197,231
FLUID SUSPENSION LEVELING CONTROL SYSTEM
James W. Holzman, Muhlenberg Park, Pa., assignor to Dana Corporation, Toledo, Ohio, a corporation of Virginia
Filed Apr. 19, 1962, Ser. No. 188,690
8 Claims. (Cl. 280—104.5)

This invention relates to suspensions in general, and more specifically to a leveling control system for fluid suspensions for use with tandem axles.

The usual fluid suspension system includes fluid filled containers of variable height; the height varying in response to the unbalance between the forces arising from internal fluid pressure and the compressive forces on the container from external loads. When a balance is reached in these forces, the containers maintain a fixed height until an unbalance arises again. Such containers are ideally suited for use as a resilient mounting between the axle and frame of a vehicle for they are capable of cushioning impact loads and further can be adapted to contain varied internal fluid pressures thereby being able to support a wide variation of loads yet still be adjustable to selective heights. Normally at least one such fluid container is interposed between each end of an axle and the superimposed vehicle frame.

In order to vary the internal pressure of a container, a source of pressure fluid and a control system must be provided therefor; the control system being adapted to admit pressure fluid from the source to the containers, thereby increasing the internal pressure and increasing the height of the container against the force of a given load, and to exhaust fluid pressure, thereby decreasing the internal pressure so that an external load can decrease the height thereof. This operation is necessary for maintaining a desired free height from axle to trailer frame, for when a load is pulled on a frame, the containers are compressed and their free height decreased. Therefore, to attain the desired free height, pressure fluid must be admitted to the container to increase the height thereof to that desired. When the load is removed from the frame, the increased pressure in the containers will extend the height thereof beyond that desired so that pressure fluid must be exhausted so that the height will return to that desired.

The prior art control systems for fluid suspensions have many shortcomings in their operation. These prior art systems normally consist of a separate valve for the fluid container (or containers) at each end of each axle; each of these valves being adapted to maintain the end of the axle associated therewith at the desired free height from the frame. Such a control system when used with tandem axles often results in one axle of the tandem being subjected to a greater load than the other. For instance, when a trailer having tandem axles is attached to a tractor having a king-pin plate either above or below the normal riding height of a trailer, the one axle of the tandem axles toward the low end of the trailer will be subjected to a greater load and its containers compressed. In order to maintain the free height between the trailer frame and the axle at the preset desired height, the control system for said one axle will admit pressure fluid to the containers thereof thereby increasing the height of the container until the desired free height is again attained. This results in a further load on said one axle and the unloading of the other axle while longitudinally leveling the trailer. To compensate for such unequally loaded condition the operator would have to separately adjust the controls for each end of each axle so that the loads thereon would be equal even though the trailer would no longer be longitudinally level.

Another unsatisfactory condition arises if the trailer is parked with wheels of one axle of the tandem axles on an incline or bump. In this condition the one axle would be loaded more than the other axle and its containers compressed. To return the height of the container to attain the desired preset free height, the control system will admit pressure fluid to the containers on the one axle thereby increasing the free height thereof and further loading the one axle while unloading the other axle. If only one wheel of one axle is on a bump, the result is that the containers on the one end of the one axle are compressed and then expanded which results in an unbalanced load and also a lateral tilting of the frame. As a result, the individual control systems do not insure a level trailer nor equal axle loadings but merely provides an equal free height between each end of each axle and the frame.

It is, therefore, an object of this invention to eliminate the problem of controlling each end of each axle of tandem axles with a separate control valve.

It is another object of this invention to provide a control system for the fluid suspension of tandem axles which insures that the load on each axle is equal.

It is yet another object of this invention to provide a control system which prevents unequal loading of tandem axles when the trailer is riding "nose" high or "nose" low due to the different height of kin-pin plates on various trailers.

It is a further object of this invention to provide a control system for a trailer having tandem axles which compensates for being parked with one wheel or both wheels of one axle on an incline or bump while insuring that the high wheel or wheels does not assume too great a load.

It is yet a further object of this invention to provide a control system for tandem axles which has a reduced number of parts and is relatively simple and inexpensive to manufacture, adjust, and maintain.

It is another object of this invention to provide a control system for tandem axles wherein each axle has at least one pressure fluid container means interposed between each end thereof and the vehicle frame, said control system including a pair of valves with one valve being adapted to control the pressure fluid in the pressure fluid container means on the ends of both tandem axles on one side of the vehicle and the other valve being adapted to control the pressure fluid in the pressure fluid container means on the ends of both tandem axles on the other side of the vehicle.

It is another object of this invention to provide such a control system wherein separate means are provided to energize each of said valves, each of said energizing means being associated with the ends of said tandem axles on one side of the vehicle respectively and being responsive to the average movement of said respective ends relative to the vehicle frame.

Further and other objects of this invention will become apparent upon a consideration of the specification when taken in conjunction with the following drawings wherein.

Figure 1:
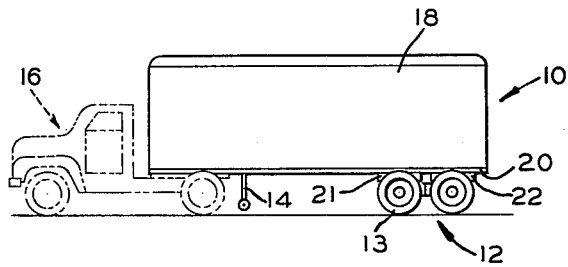
FIG. 1 is a side elevational view of a trailer embodying this invention.
Figure 2:
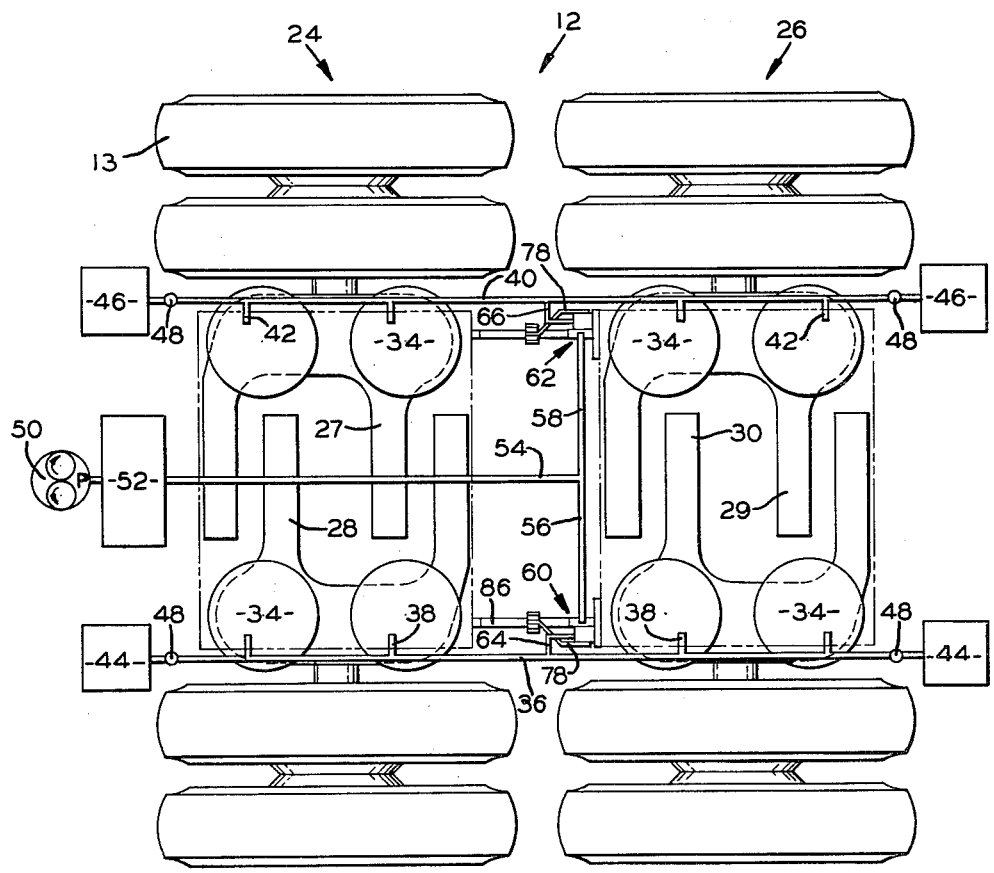
FIG. 2 is a top plan view of the tandem axles of FIG. 1 including the suspension system and control system therefor.

In a preferred embodiment of this invention a pair of tandem dead axles rotatably mounting road wheels are carried by a vehicle. Each axle of the tandem axles comprises a pair of independently suspended swinging half axles; however, it should be understood that axles of other types may be used without departing from the scope of this invention. Interposed between the outboard end of each half axle and the vehicle frame is a fluid spring means in the form of a pair of air springs. The air springs on each side of the vehicle are connected to a common air supply and exhaust line and a pair of surge tanks. The surge tanks accommodate air which is suddenly expelled from the air springs, such as when subjected to impact loads from the vehicle wheels striking a bump, and the like, and include a metering valve which allows the flow of air into the surge tanks to occur more rapidly than the flow of air out of the surge tanks when returning to the air springs so that the tanks serve the combined purpose of surge tanks and shock absorbers (that is, means to dampen oscillations of the air springs through controlled air flow).

The supply and exhaust of air for the common supply line for all the air springs on each side of the vehicle is controlled by a separate valve. In this manner the air springs for the ends of the tandem axles on the same side of the vehicle are controlled by the same valve. Separate means are provided to energize the valve on each side of the vehicle; the energizing means being adapted to energize the valve in response to the average of the movement of the axles relative to the vehicle frame.

Referring to the drawings, a trailer shown generally at 10 is provided with tandem axles 12 having ground wheels 13 thereon. A landing gear 14 is carried adjacent the front end of the trailer 10 to support the same when it is not being carried by a tractor 16 shown in phantom. The trailer 10 includes a freight containing portion or box 18 which is carried on a frame 20, which in turn is suitably secured to a pair of sub-frames 21 and 22. Each sub-frame 21 and 22 carries one axle 24 and 26 respectively of the tandem axles 12.

Figure 3:
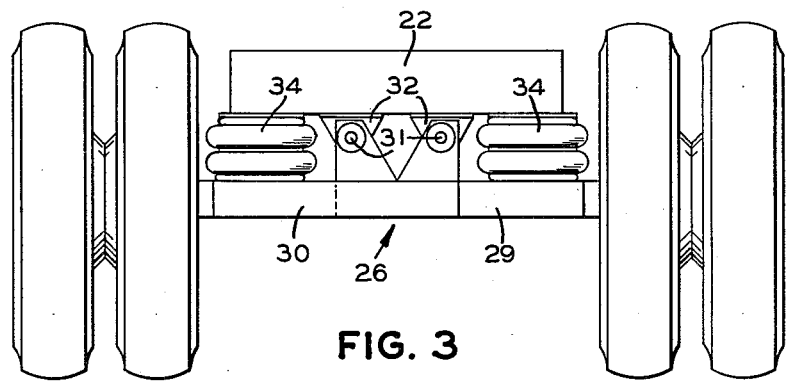
FIG. 3 is a rear elevational view of the tandem axles of FIG. 2 with a sub-frame mounted thereon.

The axles 24 and 26 are of the swing axle type and each includes a pair of yoke-shaped half axles 27, 28 and 29, 30 respectively. As shown in FIG. 3, the inward end of the half axles 29 and 30 are pivotally mounted for vertical oscillation on the sub-frame 22 by means of pins 31 passing through registering openings in the half axles and in the support brackets 32 carried by the sub-frames. The half axles 27 and 28 are mounted to the sub-frame 21 in the same manner. The outboard end of each half axle carries a pair of longitudinally aligned fluid containers in the form of air springs 34. The air springs 34 are interposed between the outboard end of the half axles and the sub-frames 21 and 22 and secured thereto in a well known manner.

The air springs 34 for half axles 28 and 30 are each connected to a manifold air supply and exhaust line 36 by means of branch lines 38, while the air springs 34 on the half axles 27 and 29 are each connected to a manifold air supply and exhaust line 40 by means of branch lines 42. The manifold lines 36 and 40 are each provided with a pair of surge tanks 44 and 46 respectively.

The connection between the surge tanks 44 and 46 and the respective manifold lines 36 and 40 includes a valve 48. The valve 48 is of the well known type which allows free flowing of the air from the air springs 34 into the surge tanks while restricting the flow of air out of the surge tank when it is returning to the air springs. In this manner the surge tanks 44 and 46 serve a dual purpose by acting as a surge tank and as a shock absorber.

A source of fluid pressure in the form of an air pump 50 constantly provides a supply of air pressure in a reservoir 52. The reservoir 52 is confluent with a main air supply line 54 which branches into two individual air supply lines 56 and 58. The supply lines 56 and 58 lead to control valves 60 and 62 respectively. The control valves 60 and 62 are connected to the manifold lines 36 and 40 respectively by the tap lines 64 and 66 respectively. The tap lines are of a much smaller diameter than the branch lines 38 and 42 and the manifold lines 36 and 40 so that air flow may occur much more readily in the branch and manifold lines than in the tap lines.

The following explanation of the half axles 28 and 30 and of the operation of the suspension system thereof is applicable to the half axles 27 and 29 since the structure and operation thereof are the same and therefore will not be separately explained.

Figure 6:
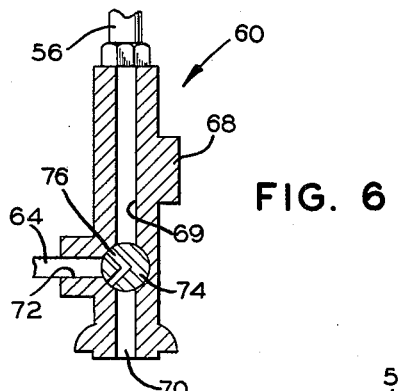
FIG. 6 is a diagrammatic representation of a valve suitable for use in the control system of this invention.

Referring to FIG. 6, wherein the valve 60 is shown in detail and includes a valve body 68 having an axially extending opening 69 therethrough confluent with the supply line 56 at one end and open to the atmosphere at the other end 70 and a lateral branch opening 72 which is confluent with the opening 69 and the tap line 64. A valve stem 74 is rotatably carried by the body 68 and positioned at the junction of the openings 69 and 72. A substantially V-shape opening 76 traverses the stem 74 and is adapted to alternately join the lines 64 and 56 or line 64 and opening 70 in a confluent relationship. In an intermediate position of the stem 74, as shown in FIG. 6, the ends of the openings 76 are in a closed position, being blocked by the body 68, and none of the lines are in a confluent relationship.

The stem 74 of the valve 60 has secured thereto an operating lever 78 adapted to rotate the stem. Movement of the lever 78 and stem 74 from the intermediate position in a clockwise direction brings the lines 56 and 64 into confluent relationship allowing air from the reservoir 52 to enter the manifold 36 and air springs 34 while movement in a counterclockwise direction brings the line 64 and the opening 70 into confluent relationship thereby allowing the air in the manifold 36 and air springs 34 to exhaust to the atmosphere.

The operating lever 78 is adapted to be energized by means responsive to the average of the movement of the outboard ends of the half axles 28 and 30 relative to the sub-frames 21 and 22 respectively. More specifically, a connecting rod 80 includes an upper portion 82 (FIG. 5) pivotally attached to the lever 78 by means of a pin 81 passing through registering openings therein, a lower portion 84 which is pivotally attached to the midpoint of a hollow centralizing rod 86 by means of a pin 81 passing through registering openings therein, and a central portion 88 which is attached to both the upper and lower portions 82 and 84 by means of the threaded arrangements shown generally at 85 and 83 respectively. The threaded arrangements 85 and 83 are of opposite "hand" so that rotation of the central portion 88 in one direction increases the length of the connecting rod 80 while rotation in the opposite direction shortens the connecting rod 80.

Slidably received in the centralizing rod 86 are a pair of opposed plungers 89 and 90 of equal length. The outer end of the plunger 89 is pivotally mounted by a pin 91 on a bracket 92 fixedly secured to the half axle 28, while the outer end of the plunger 90 is pivotally mounted by a pin 93 on a bracket 94 fixedly secured to the half axle 30. A pair of springs are carried within the centralizing rod 86 with the spring 96 interposed between the plunger 89 and the pin 87 and the spring 98 interposed between the plunger 90 and the pin 87, thus resulting effectively in a pair of cylinders in back-to-back relationship and separated by pin 87 with a separate plunger for each cylinder. The springs 96 and 98 are of substantially equal biasing effect so that the distances between the axles 28 and 30 and the pin 87 remain variable and equal even if the axles 28 and 30 move relative to each other.

With the structure as above described, vertical movement of the central portion of centralizing rod 86 will induce a movement in the operating lever 78 through the connecting rod 80, and since the connecting rod 80 is attached to the pin 87 which is always equidistant between the axles 28 and 30, by well known geometric principles if the bracket 94 moves upwardly to the phantom position 94', the medially positioned pin 87 will move to the phantom position 87', which is a movement of half the magnitude as the movement from 94 to 94'. The connecting rod 80 will move to the position 80' and in so doing will move the operating lever 78 clockwise to the position 78' thereby opening the valve 60 to admit air from the line 56 into the line 64, the manifold 36 and air springs 34.

Figure 5:
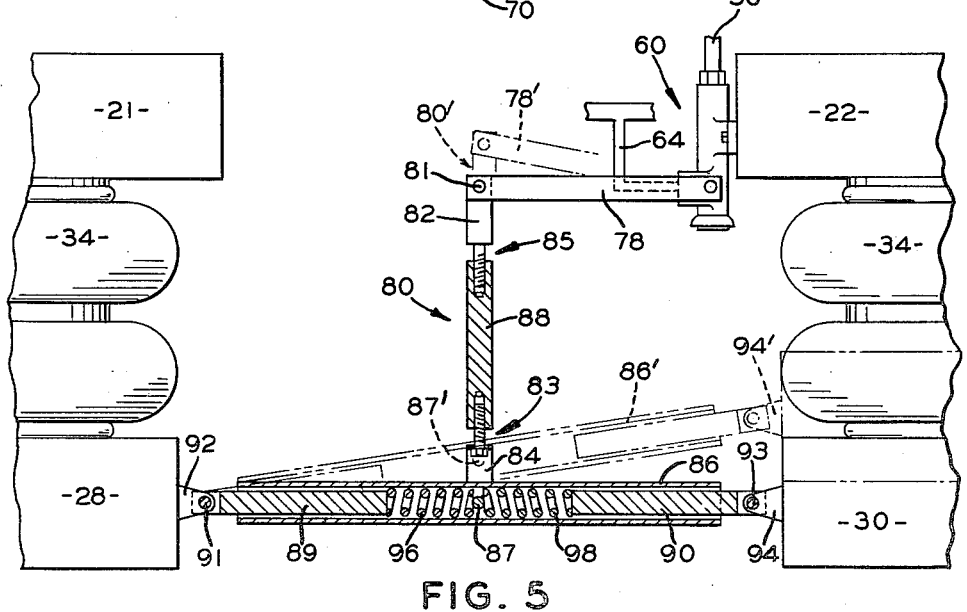
FIG. 5 is a side elevational view of an embodiment of the valve energizing means of this invention.
Figure 4:
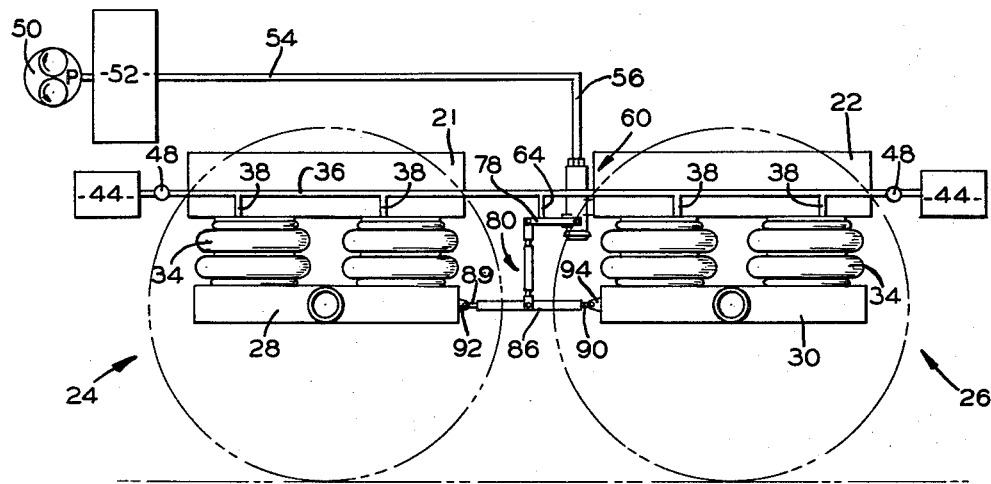
FIG. 4 is a side elevational view of the tandem axles of FIG. 3.

Therefore, it is apparent that the lever 78 is actuated in response to the average of the movement of the axles 28 and 30 relative to the sub-frames 21 and 22. As shown in FIG. 5, since this average distance has decreased, the valve 60 has been opened to admit additional air to the air springs 34 to expand the same thereby increasing the distance (free height) between the axles 28 and 30 and the sub-frames 21 and 22. This increase will continue until the average distance is such that the operating lever is again centralized in the position as preselected. Since the length of the connecting rod 80 may be adjusted, the free height may be preselected to a desired magnitude.

Figure 7:
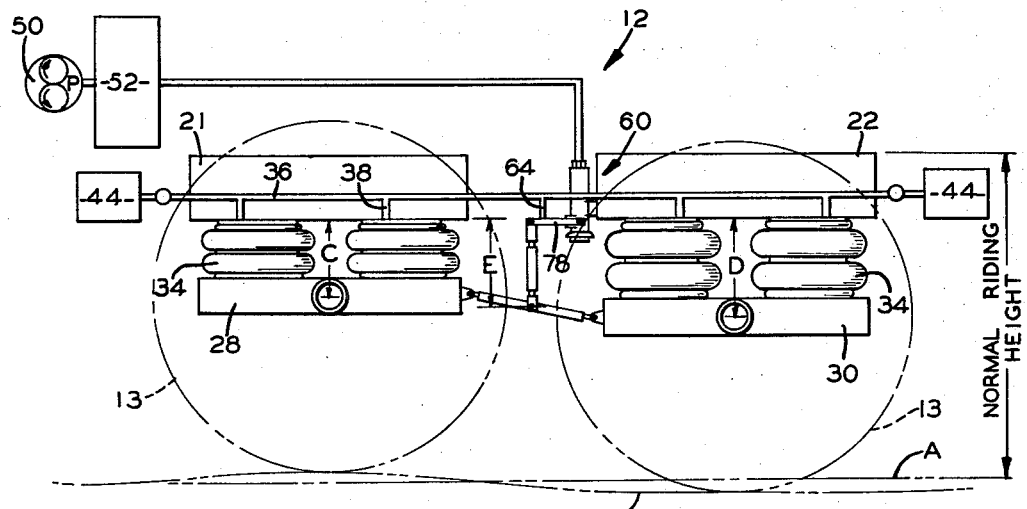
FIGS. 7, 8 and 9 are views according to FIG. 4 showing the tandem axles in different operating conditions.

Referring to FIG. 7 wherein the tandem axle 12 is shown in one of its operating positions, the normal flat road line is shown at A while the variation from normal is shown at B. The ground wheel 13 on the axle 30 has dropped below the normal road line while the ground wheel 13 of the axle 28 is above the normal ground line. The air springs 34 between the axle 28 and the sub-frame 21 have been compressed thereby decreasing the free height C while the air springs 34 between the axle 30 and the sub-frame 22 have expanded thereby increasing the free height D. The distance E, representing the distance between the sub-frames and the medial point of the centralizing rod 86, is equal to the average of distance C and D, and has not changed from the original free height. Even though the connecting rod has moved angularly, its midpoint has not moved vertically so that no movement has been induced to the operating lever 78. Therefore, no air is admitted nor exhausted by the valve 60. The load on the axle 28 and 30 remains equal and since the average height of the axles is unchanged there will be no change in the normal riding height nor lateral tipping of the vehicle 10.

Figure 8:
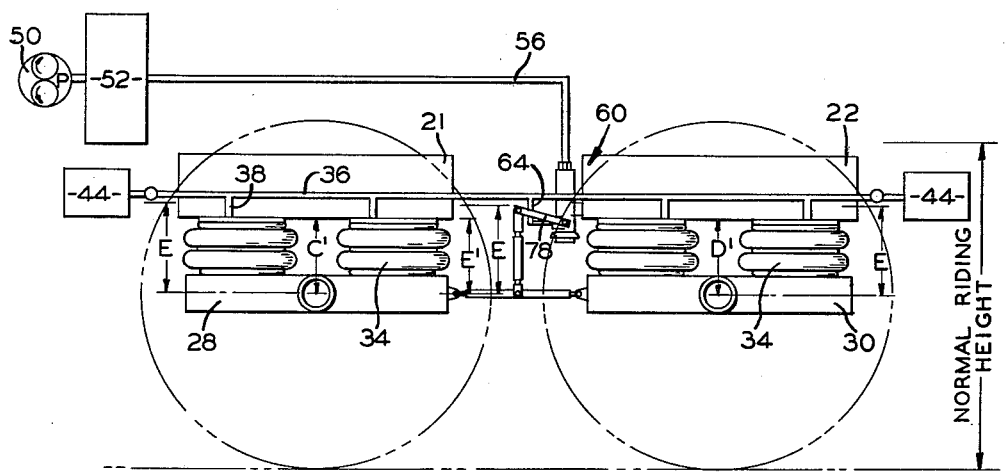

FIG. 8 represents the condition which arises when a load is placed upon the sub-frames 21 and 22 thereby compressing the air springs 34. Here the distances C' and D' are both less than the originally selected free height E so that the distance E', representing the average of C' and D', is also less than originally selected. The operating lever 78 has been moved clockwise thereby opening valve 60 to admit air from the line 56 through the line 64 into the manifold 36 and air springs 34. This additional air expands the air springs 34 against the increase load until the air springs are returned to their preselected height so that the operating lever 78 closes the valve 60.

Figure 9:
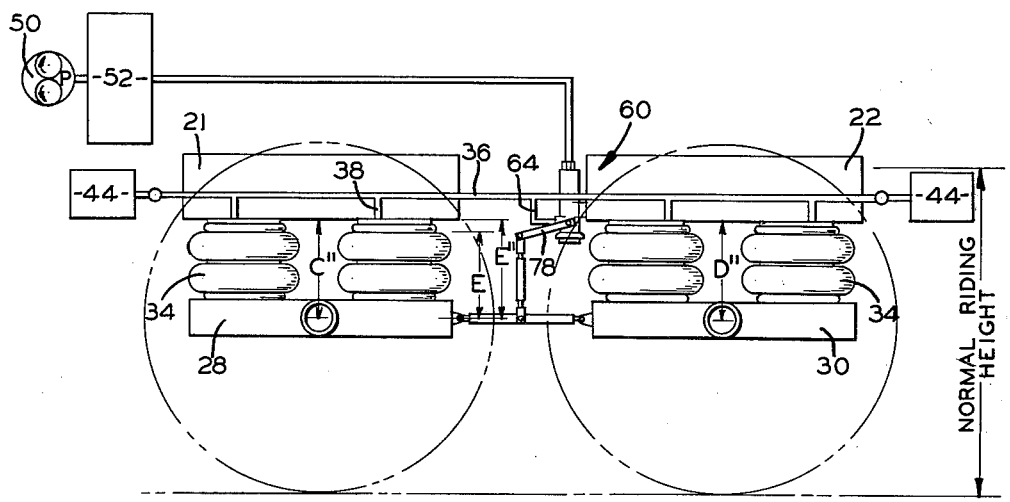

FIG. 9 represents the condition which arises when a load is removed from the sub-frames 21 and 22 thereby allowing the increased air in the spring 34 (the increased air having been introduced under a loaded condition as shown in FIG. 8) to expand the same beyond the free height originally selected. Here the distances C" and D" are both greater than the originally selected free height E so that the distance E" representing the average of C" and D" is also greater. The operating lever 78 is moved counterclockwise thereby opening valve 60 to exhaust air from the air springs 34 through the lines 36 and 64. This exhausting continues until sufficient air is removed so that the air springs 34 return to their original height and the operating lever 78 closes the valve 60.

As previously described, the line 64 is much smaller than the lines 36 and 38 and therefore allows air to flow past the same at a much lower, slower rate. This has been provided so that under operating conditions a sudden change in free height of short duration will be accommodated by a compression of the air in the air springs 34 into the surge tanks 44 through the large lines 36 and 38. Even though the lever 78 may be momentarily moved to a position which opens the valve 60, the flow of air through the line 64 is slight compared to that which flows through the lines 36 and 38 and does not under these conditions interfere with the normal operation of the air suspension. It is only when the free height remains changed for a substantial period that the valve 60 will be operable to return the free height to that previously selected.

While only a single embodiment of this invention has been shown and described, it is apparent that there may be many changes in the structure as well as operation thereof without departing from the scope of the appended claims.

What is claimed is:

1. The combination with a vehicle having a frame superimposed on a pair of tandem axles and fluid filled spring means disposed between the outer ends of each axle and said frame, of a first and a second manifold confluent with said fluid filled spring means on one and the other side of the vehicle respectively, and a first and a second control valve operatively associated with said first and second manifold respectively, a source of fluid pressure confluent with said control valves, said control valves being adapted in a first position to join their respective manifold in a confluent relationship with the atmosphere and in a second position to join their respective manifold in a confluent relationship with said source of fluid pressure and in a third position to close their respective manifold, and a first and a second means for energizing each of said first and second valves respectively, said first and second means being operative respectively in response to the average of the movement of the axles on the one and on the other side of the vehicle relative to the frame.

2. A suspension system for a vehicle equipped with tandem axles comprising in combination, a pair of tandem axles, air spring means associated with the outboard ends of said axles and adapted to be disposed between said axles and the vehicle, a first manifold line confluent with all said air spring means on one side of said tandem axles, a second manifold line confluent with all said air spring means on the other side of said tandem axles, a source of pressurized air, a first and a second three positioned valve confluent with said first and second manifold lines respectively, said source of air and the atmosphere, said valves being adapted in a first position to join the manifold line confluent therewith in a confluent relationship with said source of pressurized air and in a second position to join the manifold line confluent therewith in a confluent relationship with the atmosphere and in a third position to close the manifold line confluent therewith, and a first and a second means for energizing said first and second valves respectively and being adapted to be secured to the vehicle, a first and a second centralizing means, said first and second energizing means being connected by said first and a second centralizing means to the outboard end of said tandem axles on the one side and on the other side of said axles respectivley, said centralizing means including means maintaining said energizing means in a medial position relative to said axles whereby said energizing means is adapted to energize said first and second valves in response to the average of the movement of the axles on the one and on the other side of said tandem axles respectively relative to the vehicle.

3. The combination with a vehicle having a frame superimposed on a pair of tandem axles and a fluid filled spring means disposed between the outer ends of each axle and said frame, of a first and a second manifold confluent with said fluid filled spring means on one and the other side of the vehicle respectively, and a first and a second control valve operatively associated with said first and second manifold respectively and fixedly positioned relative to said frame, a source of fluid pressure confluent with said control valves, said control valves being adapted in a first position to join their respective manifold in a confluent relationship with the atmosphere and in a second position to join their respective manifold in a confluent relationship with said source of fluid pressure and in a third position to close their respective manifold, and a first and a second means for energizing said first and second valves respectively, said energizing means each including a lever means for operating its respective valve, and a centralizing means operatively connected to said lever means, said centralizing means being connected to said axles on one and the other side of the vehicle respectivley and including means for maintaining the operative connection to said lever means in a medial position relative to said axles connected thereto.

4. A suspension system for a vehicle comprising in combination, a pair of tandem axles, a vehicle frame having opposed sides and being superimposed on said axles, a plurality of air springs with at least one disposed between each end of each axle of said tandem axles and said frame adjacent the outer end of said axle, a first manifold including a surge tank confluent with all said air springs on one lateral side of said frame and a second manifold including a surge tank confluent with all said air springs on the other lateral side of said frame, a source of pressurized air, a first and a second three position valve fixedly positionable relative to said frame and being confluent with said first and second manifold respectively, said source of pressurized air and the atmosphere, said valves being adapted in a first position to join the manifold confluent therewith in a confluent relationship with said source of pressurized air and in a second position to join the manifold confluent therewith in a confluent relationship with the atmosphere and in a third position to close the manifold confluent therewith, and a first and a second means for energizing said first and second valve respectively, said first energizing means being disposed adjacent one side of said frame and said second energizing means being disposed adjacent the other side of said frame, each of said energizing means including a lever and a centralizing means, said centralizing means being operatively connected to a portion of each of said axles on its respective side of said frame and having a midpoint and including means for maintaining the midpoint thereof medially positioned relative to said axles operatively connected thereto regardless of the movement thereof, said lever being operatively connected to said valve and to said centralizing means at the midpoint thereof, whereby said first and second valves are energized in response to the average movement of said axles relative to said frame on the one and on the other side of said frame respectively.

5. A suspension system for a vehicle comprising in combination, a pair of tandem axles with each axle of said tandem including a pair of half axles, a vehicle frame having a longitudinally extending axis and opposed sides, said half axles of each tandem axle being pivotally mounted at their inner end to said frame and having their outer ends extending toward opposite sides of said vehicle, a plurality of air springs with at least one disposed between each half axle and said frame adjacent the outer end of said half axle, a first common manifold including a surge tank confluent with all said air springs on one lateral side of said frame and a second common manifold including a surge tank confluent with all said air springs on the other lateral side of said frame, a source of pressurized air, a first and a second three position valve fixedly positionable relative to said frame and being confluent with said first and second manifold respectively, said source of pressurized air and the atmosphere, said valves being adapted in a first position to join the manifold confluent therewith in a confluent relationship with said source of pressurized air and in a second position to join the manifold confluent therewith in a confluent relationship with the atmosphere and in a third position to close the manifold confluent therewith, and a first and a second means for energizing said first and second valve respectively and being disposed on opposite sides of said frame axis, each of said energizing means including a lever and a centralizing means, said centralizing means being operatively connected to said half axles adjacent the outer end thereof on its respective side of said frame axis and having a midpoint and including means for maintaining the midpoint thereof medially positioned relative to said half axles operatively connected thereto regardless of the movement thereof, said lever being operatively connected to said valve and to the midpoint of said centralizing means, whereby said first and second valves are energized in response to the average movement of said half axles relative to said frame on the one and on the other side of said frame respectively.

6. A suspension system for a vehicle comprising in combination, a pair of tandem axles with each axle of said tandem axles including a first and a second half axle, each of said half axles having an inner and an outer end, a vehicle frame having opposed sides and being superimposed on said axles, means pivotally mounting the inner end of each of said half axles to said frame, said first half axle of each tandem axle having its outer end extending toward one side of said frame and said second half axle of each tandem axle having its outer end extending toward the other side of said frame, a plurality of air springs with at least one being disposed between each half axle and said frame adjacent the outer end of said half axle, a first manifold line including a surge tank for all said air springs on said one side of said frame, a second manifold line including a surge tank for all said air springs on said other side of said frame, a source of pressurized air, a first and a second three position valve fixedly positionable relative to said frame and being confluent with said first and second manifold line respectively, said source of pressurized air and said atmosphere, said valves being adapted in a first energized position to join the manifold line confluent therewith in a confluent relationship with said source of pressurized air and in a second energized position to join the manifold line confluent therewith in a confluent relationship with the atmosphere and in a third energized position to close the manifold line confluent therewith, and a first and a second means for energizing said first and second valve respectively, said first energizing means including a first lever and a first centralizing means, said first centralizing means comprising a first pair of cylinders each having a spring loaded piston slidably received therein, one piston and cylinder of said first pair of pistons and cylinders being operatively connected to one of said first half axles and the other piston and cylinder of said first pair of pistons and cylinders being operatively connected to the other of said first half axles, said operative connections being adjacent the outer ends of said first half axles, said first pair of pistons and cylinders being operatively interconnected at a point medially positioned between said first axles whereby said point is maintained medially positioned relative to said first half axles operatively connected thereto regardless of the movement thereof, said second energizing means including a second lever and a second centralizing means, said second centralizing means comprising a second pair of cylinders each having a spring loaded piston slidably received therein, one piston and cylinder of said second pair of pistons and cylinders being operatively connected to one of said second half axles and the other piston and cylinder of said second pair of pistons and cylinders being operatively connected to the other of said second half axles, said operative connection being adjacent the outer ends of said second half axles, said second pair of pistons and cylinders being operatively interconnected at a point medially positioned between said second half axles whereby said point is maintained medially positioned relative to said second half axles operatively connected thereto regardless of the movement thereof, said first and second levers being operatively connected to said first and second valves respectively and operatively connected to said first and second centralizing means respectively at the medially positioned point thereof, whereby said first and second valves are energized in response to the average movement of said first half axles on said one and said second half axles on said other side of said frame respectively.

7. A suspension system for a vehicle comprising in combination, a longitudinally extending sub-frame having a longitudinally extending central axis and one and another opposed lateral sides and adapted to carry a vehicle main frame thereon, a first pair of longitudinally spaced half-axles each having their inner ends pivotally secured to said sub-frame on one side of said axis and extending transversely of sub-frame with their outer ends extending beyond said other lateral side thereof, a second pair of longitudinally spaced half-axles having their inner ends pivotally secured to said sub-frame on the other side of said axis and extending transversely of said sub-frame with their outer ends extending beyond said one lateral side thereof, first fluid pressure spring means operatively disposed between each of said first pair of half-axles and said sub-frame adjacent the outer ends of said first half-axles, second fluid pressure spring means operatively disposed between each of said second pair of half-axles and said sub-frame adjacent the outer ends of said second half axles, a first and a second manifold line including a surge tank confluently connected to said first and second fluid spring means respectively, a source of pressurized fluid, a first and a second three positioned valve carried by said sub-frame and being confluent with said first and second manifold line respectively, said source of pressurized fluid and the atmosphere, said valves being adapted in first and second opposed energized positions to join the manifold line confluent therewith in a confluent relationship with said source of pressurized fluid and the atmosphere respectively and in a third intermediate position to close said manifold line confluent therewith from said source of fluid pressure and the atmosphere, a first and a second substantially vertically extending lever having a central position and opposed upward and downward vertical positions on opposite sides of said central position, means operatively connecting said first and second levers to said first and second valves respectively whereby said levers in their central position maintain their respective valve in its third position and in their upward position energize their respective valve to its first position and in their downward position energize their respective valve to its second position, a first and a second longitudinally extending centralizing means each having a midpoint and being operatively connected at said midpoint to said first and second levers respectively and having opposed longitudinal ends, said first and said second centralizing means having their longitudinally opposed ends operatively connected to said first and second half-axles respectively and each including means maintaining the midpoint therof medially positioned relative to the half-axles operatively connected to the same whereby movement of said first and second half-axles toward and away from said frame respectively moves said first and second lever respectively upwardly and downwardly an amount equal to the average movement of said respective half-axles and thereby energizing said first and second valves respectively.

8. A suspension system according to claim 7 wherein each of said centralizing means includes a first and a second cylinder containing respectively a first and a second spring loaded piston with said first piston and cylinder being disposed on one longitudinal side of said midpoint and said second piston and cylinder disposed on the other longitudinal side of said midpoint, and wherein said first centralizing means is secured to said first half-axle on the other side of said longitudinal axis and said second centralizing means is secured to said second half-axles on said one side of said longitudinal axis.

References Cited by the Examiner

UNITED STATES PATENTS

| | | | |
|---|---|---|---|
| 2,623,758 | 12/52 | Cruz | 280—112 |
| 2,790,650 | 4/57 | Boschi. | |
| 2,913,252 | 11/59 | Norrie | 280—104.5 |

FOREIGN PATENTS

| | | |
|---|---|---|
| 1,238,682 | 7/60 | France. |
| 866,121 | 4/61 | Great Britain. |

A HARRY LEVY, *Primary Examiner.*

PHILIP ARNOLD, *Examiner.*

UNITED STATES PATENT OFFICE
CERTIFICATE OF CORRECTION

Patent No. 3,197,231      July 27, 1965

James W. Holzman

It is hereby certified that error appears in the above numbered patent requiring correction and that the said Letters Patent should read as corrected below.

Column 1, line 38, for "pulled" read -- placed --; column 2, line 28, for "kin-pin" read -- king-pin --; column 4, line 48, for "81" read -- 87 --; column 6, line 32, for "enargizing" read -- energizing --; column 7, line 27, for "laterial" read -- lateral --.

Signed and sealed this 22nd day of March 1966.

EAL)

test:

\NEST W. SWIDER
testing Officer

EDWARD J. BRENNER
Commissioner of Patents